June 26, 1962 H. M. REXRODE ET AL 3,041,517
FLOW PROPORTIONAL MOTOR CONTROL
Filed Aug. 13, 1958 3 Sheets-Sheet 1

INVENTORS
HAMPTON M. REXRODE
WILLIAM B. HARRISON, JR.
BY
Mason, Porter, Diller & Stewart
ATTORNEYS

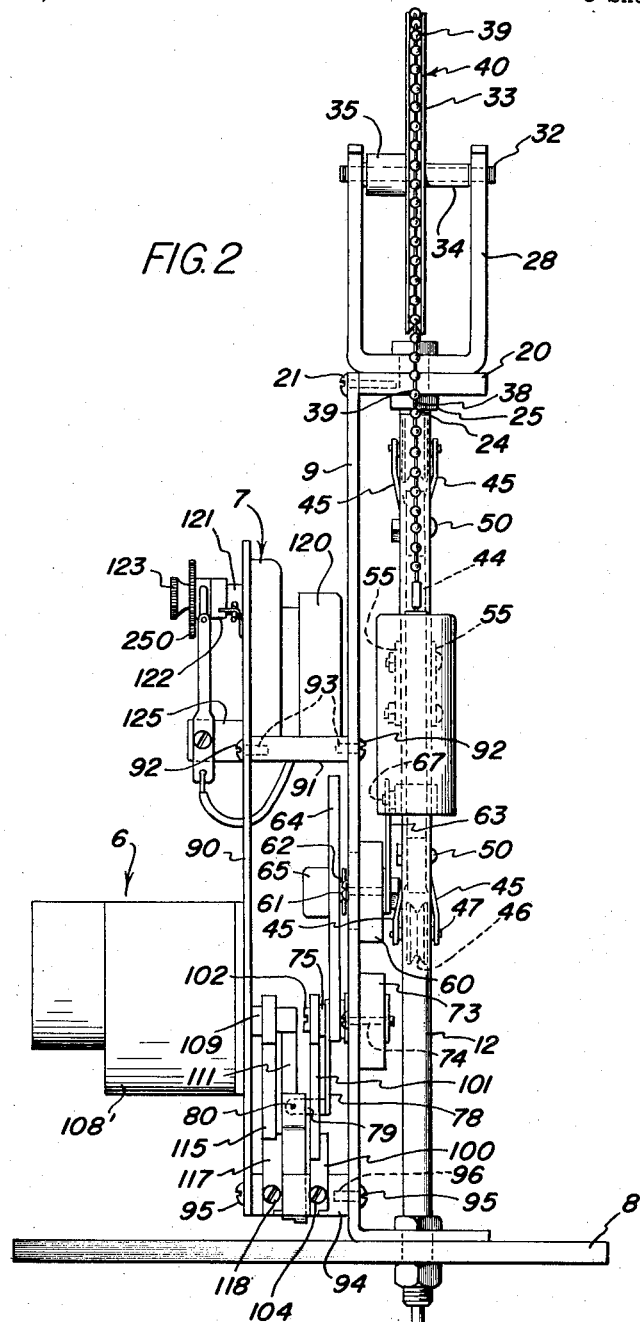

June 26, 1962  H. M. REXRODE ET AL  3,041,517
FLOW PROPORTIONAL MOTOR CONTROL
Filed Aug. 13, 1958  3 Sheets-Sheet 3

INVENTORS
HAMPTON M. REXRODE
WILLIAM B. HARRISON, JR.
BY Mason, Porter, Diller & Stewart
ATTORNEYS

United States Patent Office 3,041,517
Patented June 26, 1962

3,041,517
FLOW PROPORTIONAL MOTOR CONTROL
Hampton M. Rexrode and William B. Harrison, Jr., Richmond, Va., assignors to Phipps & Bird, Inc., Richmond, Va.
Filed Aug. 13, 1958, Ser. No. 754,805
11 Claims. (Cl. 318—444)

The present invention relates to improvements in motor control apparatus, and more particularly to a motor control apparatus for energizing a motor adapted to drive a pump or the like for taking samples of effluent waste periodically at a rate proportional to the flow of the effluent waste or the like.

One object, is to provide a motor control apparatus for driving a pump to take test samples periodically during the rise and fall of the level of a liquid or effluent waste as it flows over a weir which will maintain a constant ratio between the frequency at which said motor and pump unit are operated and the rate of flow of the liquid or waste material over the weir.

Another object, is to provide a motor control apparatus in which the frequency of operation of the motor pump is governed directly as the rate of flow of the liquid or effluent waste over the weir with the rise and fall of said effluent waste.

Another object, is to provide a control apparatus for an electric motor which is adapted to drive a pump or similar device for periodically taking test samples at a rate inversely proportional to the effluent waste flow and to provide control means in addition to the above for energizing the motor for predetermined periods of time during each period of frequency operation. That is to say, each time the motor is energized to drive the pump at a predetermined frequency, the duration of said energization will be timed to a predetermined interval so that the pump will be de-energized after the predetermined period. Thus, the electric motor may be energized periodically in proportion to the rate of flow of the liquid over a weir or the like and the time period controlled for each frequency period.

Another object, is to provide an electric motor control apparatus including a timer mechanism controlled by a float or other liquid responsive device having a control cam provided with a cam surface designed particularly for the type of weir with which the apparatus is intended to be used.

Another object, is to provide a motor control circuit for the various control elements including a float timer and pump timer controlled by a suitable solenoid and electromagnetically operated switches in such a manner that during each cycle of operation the float timer will be initially energized so that after a short time period, the length of which is dependent upon the position of the liquid level in the weir, the circuit will energize the pump timer and electric motor pump unit simultaneously so that the motor will run for a predetermined time period after which the circuit will be restored for the beginning of a new cycle of operation which is governed by manual adjustment of the pump timer with the frequency of the cycle controlled by the relative position of the liquid level of the weir.

Another object, is to provide an electric motor control apparatus having an accurately designed and shaped cam member to follow the law of the weir being used and to translate float height in the weir to the angular position of one of the float timer contacts such that when the liquid level of the weir is high the float will be raised and the angular distance between the timer contacts will be decreased. During these periods the electric motor will be operated at a greater frequency to remove liquid test samples by pumping the same to a test station and when the liquid level falls the periodic operation of the electric motor will be decreased so that the pump will only take samples after long periods and until the liquid level in the weir has risen.

Another object, is to provide an electric motor control in which the timer switch elements for the float timer and pump timer are spring returned to their initial position after each cycle of operation to re-set the control circuit for a new cycle.

Other objects and advantages of the invention will become apparent during the course of the following description of the accompanying drawings wherein:

FIGURE 2 is a side elevational view of the electric motor control apparatus showing the manner in which the float timer and pump timer are mounted on the apparatus and the drive arrangement between the control cam plate and the secondary movable contact of the float timer.

Figure 1:
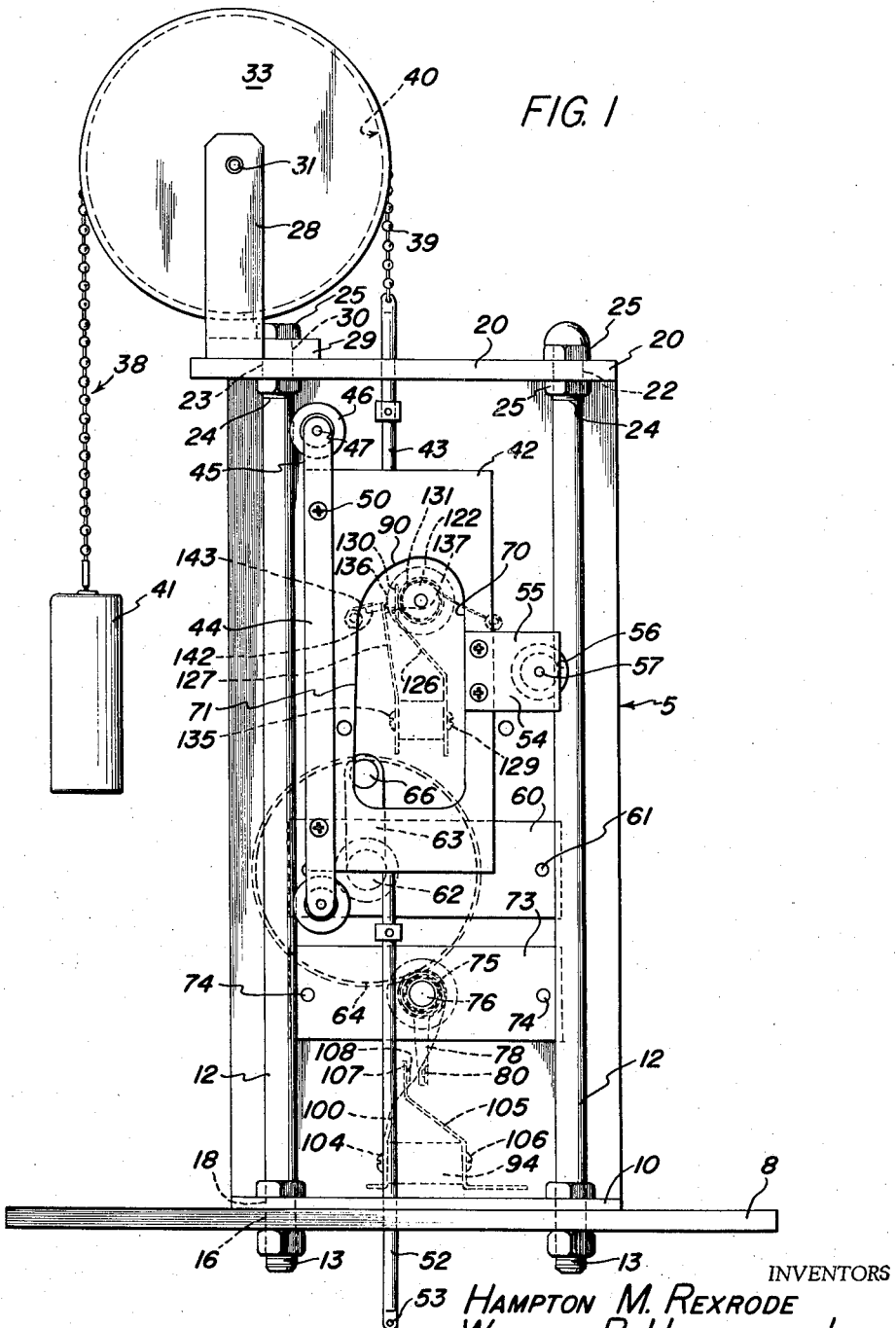
FIGURE 1 is a front elevational view of the electric motor control apparatus showing the manner in which the float operated cam is slidably mounted in suitable guides to actuate one of the movable contacts of the float timer.
Figure 3:
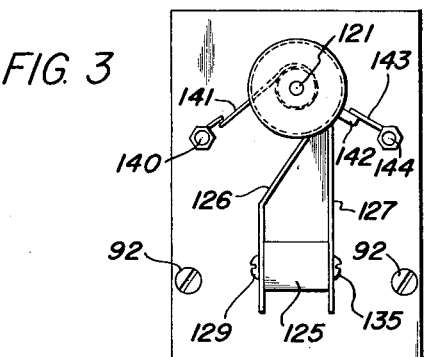
FIGURE 3 is a rear elevational view illustrating the support for the float timer and pump timer, and showing the manner in which the contacts of said timers are arranged.

In the drawings, and more in detail, attention is first directed to FIGURES 1 to 3 inclusive, wherein there is shown a support structure generally designated 5 for accommodating and mounting of the various control elements, such as the float timer and pump timer similarly designated 6 and 7 respectively.

The frame structure 5 includes a base 8 which may be mounted above or adjacent the stilling well of a weir or the like (not shown). An angle plate having a vertical wall 9 and an angular portion 10 is secured to the base 8 by the lower ends of the pair of parallel guide rods 12 which are threaded as at 13 and extend through aligned openings 16 and 18 in the base 8 and flange portion 10 of the angle plate 9. The upper ends of the vertically extending parallel spaced guide rods 12 are similarly connected to an upper plate 20 which is secured to the extreme upper end of the vertical wall member 9 by machine screws or similar threaded fasteners 21. The upper ends of the guide rods 12 extend through openings 22 and 23 in the plate 20 and said upper ends are threaded as at 24 for receiving clamping nuts 25.

Supported on the bracket plate 20 is a U-shaped frame 28 which has an extension 29 provided with an opening 30 for receiving the upper end of one of the guide rods 12 so as to be held in a clamped position by one of the clamping nuts 25. The U-shaped frame 28 is provided with horizontally aligned openings 31 for receiving a threaded shaft 32 on which is rotatably mounted a pulley 33. Spacer blocks 34 and 35 are arranged between the pulley 33 and the arms of the U-shaped bracket 28 to maintain the pulley 33 in a centered position.

Trained over the pulley 33 is a flexible chain 38 of the type formed by a series of spherical members 39 connected by wire links or the like. The spherical elements 39 of the chain 38 are received in the grooves 40 of the pulley 33, and said groove is shaped to conform to the spherical elements 39. One end of the chain 38 is provided with a counterweight 41, while the other end is attached to a vertically movable cam plate 42 by means of a connecting rod or the like 43. The cam plate 42 is of rectilinear shape and has secured to one edge thereof a bracket bar 44 having extensions 45 arranged in spaced parallel relation for receiving grooved guide rollers 46 which are mounted on pins 47 extending through horizontally aligned bearing openings in the extensions 45 of the bracket plate 44. The bracket plate is secured to the cam plate 42 by means of threaded fasteners 50.

A float of a conventional type (not shown) is secured to the lower end of the cam plate 42 by means of a rod 52 which is suitably secured to the cam plate and is provided with an opening 53 to which the float or a chain connecting the float may be attached by means of a suitable fastening element. Mounted on the other side of the cam plate 42 is a bracket plate 54 having extensions 55 arranged in spaced parallel relation for receiving a guide pulley 56 which is rotatably mounted on a pulley pin 57 similar to the pulley pins 47 for mounting the guide rollers 46. Thus, the cam plate 42 will be slidably guided vertically between the guide rods 12 depending upon the rise and fall of the float on the lower end of the rod 52.

Secured to one face of the upright wall member 9 is a bar 60 which is held in place by threaded fasteners 61 such as screws or the like illustrated in FIGURE 2. Rotatably mounted in the bar 60 is a shaft 62 which has attached to one end thereof a cam follower arm 63, and to the other end on the opposite side of the wall member 9 a gear wheel 64. The gear wheel 64 is locked to the shaft 63 by suitable fastening elements 65 such that turning movement of the arm 63 will produce a corresponding angular movement of the gear wheel 64. The free end of the cam follower arm 63 is provided with a follower roller 66 which is mounted on a short shaft 67 anchored in an opening of a corresponding size in the end of the arm 63. The cam plate 42 is provided with a vertically extending cut-out 70 having a cam surface 71 against which the follower arm roller 66 is yieldingly urged by means of a spring rotated gear later to be described.

Mounted on the front surface of the vertical wall member 9 is a horizontal bar 73 which is held in place by suitable fastening elements 74 such as machine screws at each end thereof and rotatably supported on the bar 73 is a relatively small gear wheel 75 mounted to rotate on a short bearing pin 76 secured to the bar 73 in any approved manner. Secured to the gear wheel 75 is a contact arm 78 the lower end of which is bent at right angles to provide a contact 79 having a contact button 80. The structure thus far described will produce an angular displacement of the arm 78 depending upon the rise and fall of the effluent liquid passing through the weir, and it is to be noted that the cam surface 71 during its movement in a downward direction will only produce a slight rotational movement of the arm 78, and that said movement will be accelerated when the cam follower approaches the upper curved cam portion 90 of the cam plate 42. In this position the float would have approached its lowermost position in the body of liquid since the level of the liquid in the weir would have decreased considerably. Thus, as the float approaches the limit of its lowermost movement the angular displacement of the arm 78 will be increased in such a manner as to move the contact 80 a considerable distance from a movable controlling contact element which will be presently described, so that the frequency of motor energization will be decreased when the liquid level in the weir is similarly decreased.

In order to insulate the various electrical parts of the apparatus the short transverse bars 60 and 73 are formed of insulating material such as a phenolic condensation product such as Bakelite, and the passageways or openings in the vertical wall member 9 for accommodating the shafts 62 and 76 may be of increased diameter such that said shafts do not touch the metallic wall member 9. Supported in spaced relation from the vertical wall member 9 is a panel plate 90 which is secured to the vertical wall member 9 by a pair of spaced rods 91 at the upper end of the panel 91 and said rods are held in place by machine screws 92 which have their threaded ends received in correspondingly threaded openings in the ends of the spacer rods 91. The spacer rods 91 are also formed of insulating material such as the bars 60 and 73 and the lower portion of the panel 91 is spaced from the vertical wall member 9 by means of an insulating block 94 which is held in place by machine screws 95 which have their ends threaded in correspondingly threaded recesses 96 on each side of said block.

Secured to one side of the insulating block 94 is an arm 100 to which is attached a piece of light spring metal 101, the upper end of which is coiled around the shaft 75 and is secured thereto by means of a screw 102. The spring arm 100 is attached to the insulating block 94 by means of a binding screw 104 and is adapted to form a contact for the switch arm 78. The spring 101 is very light and serves the purpose of making an electrical connection with said contact arm 78—79 and also to keep the follower roller 66 in contact with the cam as previously described. Also, mounted on the insulating block 94 is a contact arm 105 which is held in place by a terminal screw 106. The contact arm 105 is angularly bent for a portion of its length and terminates in a straight portion 107 having a contact button 108 adapted to be engaged by the contact button 80 on the arm 78.

The panel plate 90 is adapted to support the float timer and pump timer 6 and 7, respectively, and the float timer 6 includes a casing of an alternating synchronous type motor 108' having a field winding which when energized is adapted to rotate an armature having a shaft 109 an angular distance of one revolution in a predetermined time period such as one hour. Any suitable timer clock mechanism operating on 110 volt alternating current may be used, and in the present case the armature shaft 109 is provided with a radial slot 110 (FIGURE 3) for receiving one end of a switch arm 111. The free end of the switch arm 111 is provided with a pair of opposed contact buttons 112 and 113 adapted to alternately engage the contact buttons 80 and 108. Also, secured to the armature shaft 109 by suitable means (not shown) is one end of a coil spring 114 which is relatively heavy and has its free end 115 secured to an arm 117 similar to the arm 100. The arm 117 is scured to the insulating block 94 by a terminal screw 118 which is arranged beside the terminal screw 104. The coil spring 114 is arranged to urge the switch arm 111 in a counterclockwise direction (FIGURE 3) so that the contact 113 will engage the stationary contact 108. Thus, when the float timer 6 is de-energized the spring 114 will normally urge the contacts 113 and 108 into engagement and upon energization of the float timer motor 6 the switch arm 111 will move in a clockwise direction (FIGURE 3) so that the contact button 112 will move toward and into engagement with the adjustable contact button 80.

Figure 5:
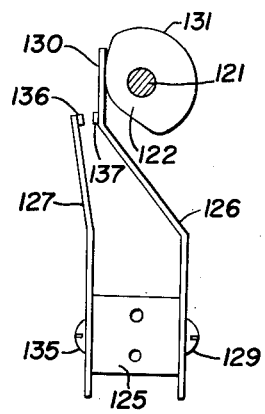
FIGURE 5 is an enlarged fragmentary elevational view illustrating the relationship of the switch arms with respect to a timer cam for positioning the switch arms relative to each other.

The pump timer 7 is also supported on the panel 90 and includes a motor 120 of an alternating current synchronous type adapted to operate on 110 volts A.C. The timer motor 120 is similar to the motor 108' and is provided with a field winding which when energized will rotate the armature shaft 121. The armature shaft 121 is provided with a cam roller 122 the position of which can be adjusted by means of a manual control knob 123. Attached to the face of the panle 90 is an insulating block 125 (FIGURES 2 and 3) which is held in place by suitable threaded fasteners (not shown). Mounted on opposite vertical walls of the insulating block 125 is a pair of switch arms 126 and 127. The switch arm 126 is provided with a terminal screw 129 and has its free end 130 presented to the cam roller 122 to be engaged by the cam lobe 131. This is best shown in FIGURE 5. The contact arm 127 is similarly secured to the insulating block by a terminal screw 135 and has its free end provided with a contact button 136 arranged in opposed relation to a contact button 137 on the free end of the contact spring 126. Thus, when the lobe 131 engages the end 130 of the resilient contact arm 126 the contact button 137 will move outwardly into engagement with the contact button 136, and upon continued rotation of the cam roller 122 the contact buttons 136 and 137 will separate. Mounted on the panel 90 is a fastening element 140 to which is attached one end of a flat spiral spring 141 which is wound around the shaft 121 and has its end secured thereto. Also secured to the shaft 121 is a radial projection 142 which is adapted to engage the stop 143 similarly secured to the panel by means of a fastening element 144. Thus, energization of the pump timer motor 120 will rotate the shaft 121 in a clockwise direction (FIGURE 3) so that the projection 142 will move away from the stop 143 and simultaneously the spring 141 will be wound on the armature shaft 121. When the motor 120 is de-energized the cam roller 122 will be rotated in a counterclockwise direction until the stop 142 engages the stop 143 at which time the contact arms 126 and 127 will be moved by the cam lobe 131 to close a circuit by moving the contact button 137 into engagement with the contact button 136.

Figure 4:
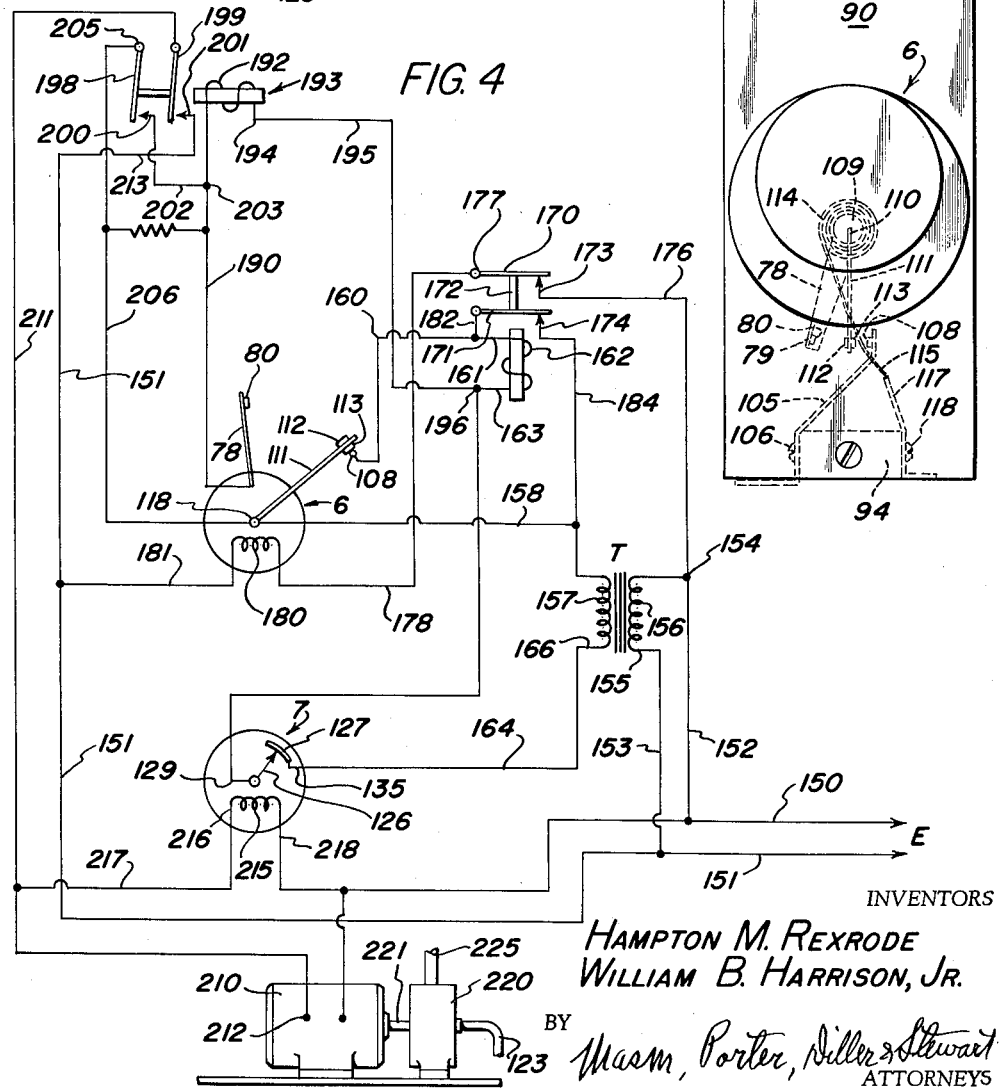
FIGURE 4 is a diagrammatic view showing the electrical circuit wiring diagram for the float timer and pump timer and illustrating the various connections between the electro-magnetic relays for the float timer and pump timer.

Referring now to the wiring diagram in FIGURE 4 where there is set forth an illustration of the manner in which the control apparatus is connected to the motor 120 is will be seen that there is provided a source of electrical energy including lines 150 and 151 connected to a source of 115 volts A.C. Branch lines 152 and 153 are connected to the terminals 154 and 155 of the primary winding 156 of a transformer T. A secondary circuit includes the secondary winding 157 of the transformer T and one terminal thereof is connected to a line 158 connected to the terminal 118 of the switch arm 111. Normally, the switch arm 111 will be urged by the spring 114 into engagement with the contact button 108 which is connected by a line 160 to the terminal 161 of a magnetic control armature having a winding 162 which is connected by a lead line 163 to the terminal screw 129 of the movable switch arm 126. The stationary switch arm 127 has its terminal screw 135 connected to a lead line 164 which is connected to the return side of the transformer 157 as at 166. Upon energization of the transformer T a circuit is completed through the winding 162 of the electromagnetic switch by the flow of current through wire 164, switch arms 126, 127, wires 163, 161, 160, switch arm 111, and wire 158, and said switch is provided with a pair of switch blades 170 and 171 connected by an armature member 172. The switch blades 170 and 171 are normally held in an open position by means of a coil spring (not shown) and are urged downwardly under the influence of the magnetic winding 162 into engagement with fixed contacts 173 and 174. The fixed contact 173 is connected by a lead wire 176 to the terminal 154 of the primary winding 156 and the other terminal 177 of the switch 170 is connected by a lead wire 178 to the field winding 180 of the float timer. The other terminal of the field winding being connected by a short lead wire 181 to the source of alternating current 151. Thus, when the switch 170 is closed a circuit is established through the field winding 180 from the line 150 through the line 152, line 176, switch blade 170 and line 178 and back to the source of electrical energy and back to the high voltage line 151 through the short lead line 181. Upon energization of the field winding 180 the switch arm 111 moves in a counterclockwise direction (FIGURE 4) so that the contact 113 will move away from the fixed contact 108 and toward the contact button 80 on the switch arm 78.

When the contacts 108 and 113 separate the switch 170 is held in a closed position by the switch blade 171 which is connected to the winding 162 of the control electromagnet by means of a short lead line 182. Thus, current will flow through the low voltage side of the transformer through the lead line 184, switch blade 171, line 182, winding 162, switch contacts 126 and 127 and thence back to the transformer winding 157 through the line 164. Since the switch arm 78 is controlled by the float (not shown) and movement of the cam plate 42, its position will be variable. For instance, if the float is in its lower position the arm 78 will be in a position distant from the switch arm 111 so that a considerable time period will elapse before the contact button 112 engages the contact button 80. However, when said contacts close and engage a circuit is established through the low voltage circuit line 158, through a lead line 190 to the winding 192 of an electro-magnetic switch 193. The other terminal 194 is connected by a lead wire 195 to the line 163 as at 196 and thence through the contacts 26—27 to the other side of the secondary transformer winding 157 through the line 164. The electro-magnetic switch 193 includes a pair of pivoted contacts 198 and 199. One of these, 199, is connected to an electric motor and is arranged to engage the fixed contact 201 which, in turn, is connected to one of the line wires 151 of the high voltage source of electrical energy. The fixed contact 200 is connected to the line 190 by means of a short lead line 202 as at 203. The switch blade 198 has its terminal 205 connected to the terminal screw 118 of the float timer motor 6 by means of a lead wire 206 such that when the winding 192 is energized the switch will be held closed through the contacts 198, 200 and lead line 202, lead 190, contacts 80 and 112 back to the transformer winding 157 through the line 158.

The contacts 199 and 201 are in circuit with an electric motor 210 and as shown in FIGURE 4 the movable contact switch blade 199 is connected to a lead wire 211, the end of which is attached to one of the motor terminals 212. The fixed contact 201 is connected to the return side of the high voltage source through line 151. Thus, closing of contacts 199 and 200 will energize the electric motor 210 and simultaneously will energize the field winding 215 of the pump timer motor 7, since one terminal of the winding as at 216 is connected to the line 211 by a short lead line 217 and the other terminal of the field winding 215 is connected to the high voltage line 150 by the short lead line 218.

Thus, the motor 210 will be energized to drive a rotary pump 220 through the armature shaft connection 221 and the intake 123 of the pump may extend into the stilling well to remove samples of effluent industrial waste or the like so that the same can be fed to a sample test station through the discharge pipe 225.

For identification purposes, the complete electrical circuit may be divided into a motor circuit and a control circuit. The motor circuit is directly connected to the power source and includes the motor 210, the field winding 215 of the timer motor 120, the field winding 180 of the timer motor 108', a portion of the electromagnetic switch controlled by the winding 162, and a portion of the electromagnetic switch 193; whereas the control circuit is conductively coupled to the motor circuit through the transformer T and includes another portion of the electromagnetic switch controlled by the winding 162, another portion of the electromagnetic switch 193, and the contacts of the timers 6 and 7.

The liquid from the weir may comprise waste from industrial plants or the like and the tests may be conducted at a remote point. Various types of tests may be conducted on the liquid such as suspended and dissolved solids tests or various bacteriological tests. In the present invention when the flow rate decreases, the frequency of pump operation decreases by reason of the movable switch arm 111 and the adjustable switch arm 78 which is controlled and governed by the position of the cam plate 42.

Since the apparatus may be used for controlling various pieces of electrical equipment it is obvious that the control apparatus may be used for governing the operation of electrical devices periodically at different frequencies with the frequency periods increased or shortened depending upon the adjustment of the cam roller 122. A dial 250 is mounted on the shaft 121 and the end of the shaft 121 is reduced and threaded (not shown) to receive the knurled thumbpiece 123. Thus, by loosening the thumbpiece 123 on the shaft 121 the cam roller 122 may be adjusted to various angular positions to lengthen or shorten the frequency period. The dial 250 may be graduated on its front wall to denote measurements of time such as hours or fractions thereof.

For consideration of the operation it will be assumed that the apparatus is arranged above the stilling well of a weir or the like so that the float attached to the rod 52 is supported by the liquid flowing in the well. In the position shown in FIGURE 1 the cam plate 42 is in its uppermost position and let it be assumed that the flow in the weir is at its highest level. In this position, the movable switch arm 78 is located only a small distance from the contact 112 and the contact 113 would be only slightly spaced from the contact 108. Thus, the motor 210 would be energized after a short time lapse which would be of sufficient length to obtain a sample and the frequency of motor energization would be proportional to the flow rate of the liquid in the weir. However, when the flow rate decreases the frequency of operation of the circuit increases such that a longer period of time will elapse before the arm 111 moves from the contact 108 to the contact 80 which would be positioned approximately 45° or angularly displaced by this distance when the float is lowered appreciably and the cam plate 42 is in nearly its extreme lowermost position. It will thus be seen that after the contact 112 engages the variable contact 80 the motor 210 will be energized and this energization will take place for a time period governed by the pump timer 7 which is energized simultaneously with the motor 210 and until the switch arm 126 has been moved out of engagement with the contact 127.

In the circuit diagram in FIGURE 4 the various electrical control elements are shown in a position in which energization of the coil 162 has taken place and the switch arm 111 is still in engagement with the contact 108 prior to movement thereof towards the variable contact 80. When this takes place the motor 210 is energized as well as the field winding 215 of the pump timer 7 and when the contacts 136 and 137 separate the circuit through the electro-magnetic coil 162 is interrupted which permits the switch blades 170 and 171 to move out of engagement with their contacts 173 and 174 and thus de-energize the field coil 180. As this occurs, the spring 115 returns the arm 111 toward the contact 108 and the circuit through the coil 193 is likewise interrupted which permits the switch arms 198 and 199 to move to an open position away from their fixed contacts 200 and 201. Thus, electrical energy is interrupted from the high voltage line 150—151 to the motor 210 and the field winding 215 of the timer 7 is likewise interrupted to permit the arm 126 to be returned to its initial position by the spring 141 so that the contacts 136 and 137 are again in engagement.

It will thus be seen that the apparatus will operate automatically to operate the sample taking pump 220 at different frequencies or time periods and that these time periods may be governed by the pump timer 7.

It is to be understood, that the form of the invention herewith shown and described is to be taken as a preferred embodiment and that various changes in the apparatus and electrical connections may be resorted to without departing from the spirit of the invention or the scope of the subjoined claims.

What we claim is:

1. In a control apparatus for an electric motor, comprising motor and control circuits, a pair of timer motors in said motor circuit, timer switches each including a movable switch arm on the respective timer motor and a pair of contacts in the control circuit adapted to be engaged by said switch arm, a pair of magnetic switches in the motor circuit both of which are normally open electrically coupled to said timer switches, one of said magnetic switches when energized by its respective timer switch being adapted to energize one of said timer switches to energize the other magnetic switch after a predetermined time period and close the motor circuit and energize the other timer motor to restore the control circuit to its initial position.

2. In a control apparatus for an electric motor, a circuit for said electric motor including a source of electrical energy, a control circuit inductively coupled to said motor circuit, a pair of timer motors in said motor circuit, contacts in said control circuit, switch arms on said timer motors engageable with said control circuit contacts to complete portions of said control circuit, solenoid switches in said control circuit one of which has a portion in said motor circuit and when engaged is adapted to close the circuit through the motor and energize the other timer motor to restore the control circuit to its initial position for a new cycle.

3. In a control apparatus for electric motors, a high voltage motor circuit and a control circuit inductively coupled thereto, a solenoid switch in the motor circuit energized by the control circuit, a pair of timer switches in said control circuit, each timer switch including a timer motor and a switch arm on each timer motor, timer switch contacts in said control circuit engageable by said switch arms, one of said timer motors being electrically coupled to and energized upon closing of said solenoid switch to close the circuit through said motor, and the other timer motor being electrically coupled to said solenoid switch and energized upon the closing of said motor circuit to open said solenoid switch and restore the control circuit to its initial position for another cycle of operations.

4. In a control apparatus for electric motors, a motor circuit having a source of electrical energy and a control circuit inductively coupled thereto, a pair of timer switches each having a timer motor in said motor circuit, each timer switch also including contacts in said motor circuit, a switch arm on each timer motor adapted to engage the respective contact in said motor circuit, a normally open relay switch in said motor circuit having a magnetic winding in said control circuit and a relay control switch in said motor circuit adapted to be closed by one of said timer switch arms after a predetermined time period and arranged to be opened by the second switch arm of said timer motor after a predetermined time period.

5. In a control apparatus for electric motors, a motor circuit including a source of electrical energy, a control circuit inductively coupled thereto, a pair of timer motors having their field windings in said motor circuit, switch arms for each of said timer motors, first and second contacts in said control circuit, the switch arm of one of said timer motors being spaced from the first contact and the switch arm of the other timer motor being in engagement with the second contact, and solenoid operated switch means normally open and adapted to be closed when the spaced switch arm engages the first contact to close the motor circuit and energize the other timer motor so that its switch arm and the second contact will move apart and restore the control circuit to its initial position for another cycle.

6. In a control apparatus for electrical devices such as motors and the like comprising a high voltage motor circuit, a low voltage control circuit inductively coupled thereto, first and second timer motors in said high voltage circuit, switch contacts in said control circuit, a switch arm for each timer motor, the switch arm of one motor being out of engagement with its corresponding contact and the switch arm of the other motor being in engagement with the corresponding contact, a relay switch in said motor circuit normally open and adapted to be closed after a predetermined time period when the first timer motor switch arm engages its contact to thereby energize the motor and the field winding of the second timer motor, and a relay switch controlled after a predetermined time period by said second timer motor switch arm to de-energize the first timer motor and permit its switch arm to be returned to restore the control circuit to its initial operating position for a new cycle of operations.

7. In a control apparatus for an electric motor adapted to drive a pump for periodically removing test samples from a liquid body comprising float means responsive to the liquid level of said body, a motor circuit for said electric motor, a control circuit inductively coupled thereto, first and second timer motors adapted to be energized by said motor circuit, a switch arm for each timer motor, cooperating contacts in said control circuit, one of said cooperating contacts being movable, means operatively connecting said float means to said contact to vary its position, normally open relay switch means in said motor circuit adapted to energize said first timer switch to move the switch arm of said first timer motor into engagement with the movable cooperating contact and close a circuit through the electric motor after a predetermined time period, and relay switch means operable by said control circuit for energizing said second timer motor and interrupting said control circuit to restore the first timer motor switch arm to its initial open position.

8. In a control apparatus for an electric motor adapted to drive a fluid pump for periodically removing test samples from a liquid flow path, float means responsive to the liquid level of said flow path, a high voltage circuit for said electric motor, a control circuit inductively coupled thereto, a pair of timer motors having field windings adapted to be energized by said motor circuit, switch arms for said first and second timer motors, a cooperating contact for each of said switch arms in said control circuit, means for returning said switch arms to an initial position in which one of said switch arms is spaced from its cooperating contact and the other switch arm is in engagement with its cooperating contact, means connecting said float means to the cooperating contact of said first timer motor switch arm to vary its position and the time duration between the closing of said contacts, a relay switch adapted to be energized by said control circuit for energizing said first timer motor, a second relay switch in said motor circuit adapted to be closed when the contact and switch arm of said first timer motor have engaged after a predetermined time period, and means operable by said second relay switch for energizing the second timer motor and interrupting the control circuit to permit the first timer switch arm to be restored to its initial position.

9. In a control apparatus for an electric motor adapted to drive a pump for the periodic removal of test samples from a liquid body comprising a float responsive to the level of said body, a cam plate connected to said float, guide means for said cam plate, a follower operated by the cam surface of said plate, a rotatable contact arm adapted to be moved and angularly displaced upon vertical movement of said cam plate, a contact carried by said contact arm, a motor circuit, a control circuit inductively coupled to said motor circuit, a pair of timer motors in said motor circuit having spring returned switch arms, one of said switch arms being arranged to engage said movable contact upon energization of said motor circuit, relay means energized upon closing of said contact to energize the other timer motor and interrupt the circuit through said first timer motor after a predetermined time period.

10. In a control apparatus for an electric motor adapted to drive a pump for periodically removing test samples from a liquid flow path, a float responsive to the liquid level of said flow path, a cam plate connected to said float, guide means for said cam plate, a cam follower engageable with the cam surface of said plate, a contact arm pivotally mounted on said guide means adapted to be angularly displaced upon vertical movement of said cam plate, a contact carried by said switch arm, a high voltage motor circuit for said electric motor, a control circuit inductively coupled to said motor circuit, a first and second timer motor having field windings adapted to be energized by said high voltage circuit, a switch arm on said first timer motor adapted to engage said movable contact to close the control circuit after a predetermined time period, a second contact in said control circuit, relay means responsive to closing of the contacts associated with said first timer motor to energize said electric motor and the winding of said second timer motor so that its switch arm will move out of engagement with said second contact and interrupt said control circuit so that the switch arm of the first timer motor may be returned to its initial position and interrupt the circuit through the winding of said second timer motor.

11. In a control apparatus for an electric motor drivingly connected to a pump for periodically removing test samples from the liquid flow path of a weir, a float in said flow path responsive to the liquid level of said weir, a cam plate connected to said float, vertical guide bars for guiding said cam plate, a cam follower pivotally supported by said guide bars engageable with the cam surface of said cam plate, a contact arm rotatably mounted adjacent said follower, a contact carried by said contact arm, means connecting said follower to said switch arm to move the same an angular distance in proportion to the movement of said float, a high voltage circuit, a control circuit coupled thereto including said contact, first and second timer motors in said control circuit, switch arms for said timer motors, a second contact in said control circuit, one of the switch arms being spaced from said rotatable contact arm and the other switch arm of said timer motor being in engagement with said second contact, and means responsive to engagement of the switch arm of the first timer motor with said rotary contact to energize the pump motor and energize the second timer motor to separate the switch arm thereof and said second contact and permit the switch arm of the first timer motor to return to its initial position for starting another cycle of operations and interrupting the circuit through the second timer motor winding to permit said switch arm to again engage its second contact for re-setting the control circuit after a predetermined time period.

References Cited in the file of this patent
UNITED STATES PATENTS

| | | |
|---|---|---|
| 2,637,835 | Davidson | May 5, 1953 |
| 2,697,196 | Harper | Dec. 14, 1954 |